(12) United States Patent
Gschwendtner et al.

(10) Patent No.: US 9,102,100 B2
(45) Date of Patent: Aug. 11, 2015

(54) APPARATUS FOR WELDING A JOINING REGION OF A FOIL TO A CONNECTING PART AND USE, METHOD, SYSTEM AND BAG

(75) Inventors: Rupert Gschwendtner, Bad Reichenhall (DE); Martin Klein, Hallein (AT)

(73) Assignee: KIEFEL GmbH, Freilassing (DE)

( * ) Notice: Subject to any disclaimer, the term of this patent is extended or adjusted under 35 U.S.C. 154(b) by 302 days.

(21) Appl. No.: 12/737,983

(22) PCT Filed: Aug. 19, 2009

(86) PCT No.: PCT/DE2009/001168
§ 371 (c)(1),
(2), (4) Date: Mar. 28, 2011

(87) PCT Pub. No.: WO2010/025699
PCT Pub. Date: Mar. 11, 2010

(65) Prior Publication Data
US 2011/0233180 A1 Sep. 29, 2011

(30) Foreign Application Priority Data

Sep. 8, 2008 (DE) .................... 10 2008 046 064
Feb. 4, 2009 (DE) .................... 10 2009 007 546

(51) Int. Cl.
*B23K 11/00* (2006.01)
*B29C 65/00* (2006.01)
(Continued)

(52) U.S. Cl.
CPC ............. *B29C 66/1122* (2013.01); *B29C 65/18* (2013.01); *B29C 66/022* (2013.01);
(Continued)

(58) Field of Classification Search
CPC .... B23K 11/00; B29C 65/04; B29C 65/7891; B29C 66/43; B29C 66/1122; B29C 65/18; B29C 66/84121
USPC .............. 219/148, 78.01, 764, 769, 770, 773, 219/777; 156/73.4, 274.4, 293, 308.2, 333, 156/380.9, 272.4; 428/195.1
See application file for complete search history.

(56) References Cited

U.S. PATENT DOCUMENTS 2,816,596 A * 12/1957 Welch, Jr. ................... 156/273.7
3,126,307 A * 3/1964 Drittenbass ................. 156/274.4
(Continued)

FOREIGN PATENT DOCUMENTS

DE        103 17 375 A1    11/2004
DE   10 2006 004 611       8/2007
(Continued)

OTHER PUBLICATIONS

International Search Report.
(Continued)

*Primary Examiner* — Dana Ross
*Assistant Examiner* — Renee L Miller
(74) *Attorney, Agent, or Firm* — Collard & Roe, P.C.

(57) ABSTRACT

The invention relates to an apparatus for welding a joining region of a foil to a connecting part, particularly two foils to a tubular connecting part. Conventional apparatuses are associated with the risk of steep workpiece flanges causing uncontrolled weaknesses in the foil and the weld seam. According to the invention, an extension of the foil outside of the joining region is provided in a controlled manner such that the foil has spare length. In this connection, the invention further relates to the use of a foil, to a method for welding, to a system for producing bag, and to a bag.

12 Claims, 2 Drawing Sheets

Figure 1:
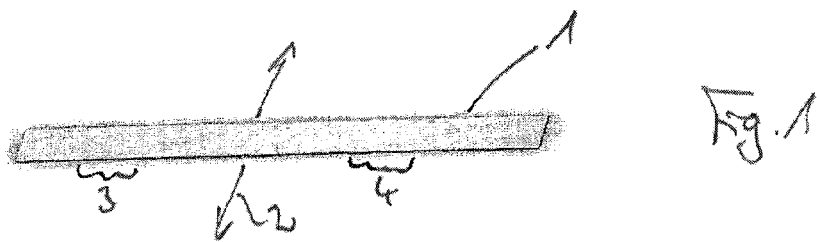

(51) Int. Cl.
   *B29C 65/18* (2006.01)
   *B31B 23/00* (2006.01)
   *B29L 31/00* (2006.01)

(52) U.S. Cl.
   CPC ............ *B29C 66/20* (2013.01); *B29C 66/3432* (2013.01); *B29C 66/43* (2013.01); *B29C 66/53262* (2013.01); *B29C 66/81427* (2013.01); *B29C 66/81431* (2013.01); *B29C 66/81811* (2013.01); *B29C 66/83221* (2013.01); *B29C 66/8432* (2013.01); *B31B 23/00* (2013.01); *B29C 66/221* (2013.01); *B29C 66/81423* (2013.01); *B29K 2995/0051* (2013.01); *B29L 2031/7148* (2013.01); *B31B 2237/10* (2013.01); *B31B 2237/50* (2013.01)

(56) References Cited

U.S. PATENT DOCUMENTS

| | | | | | |
|---|---|---|---|---|---|
| 3,205,113 | A | * | 9/1965 | McFarland, Jr. | 264/127 |
| 3,226,275 | A | * | 12/1965 | Kiess | 156/305 |
| 4,156,960 | A | * | 6/1979 | Ikeda | 29/426.2 |
| 4,352,709 | A | * | 10/1982 | Urai et al. | 156/380.6 |
| 4,950,347 | A | * | 8/1990 | Futagawa | 156/272.4 |
| 5,175,406 | A | * | 12/1992 | Roussy et al. | 219/773 |
| 5,207,852 | A | * | 5/1993 | Lightle et al. | 156/230 |
| 5,345,070 | A | * | 9/1994 | Hlavinka et al. | 219/769 |
| 5,772,824 | A | * | 6/1998 | Steinmetz et al. | 156/158 |
| 6,184,510 | B1 | * | 2/2001 | Zucker | 219/771 |
| 6,605,368 | B2 | * | 8/2003 | Smith | 428/613 |
| 2002/0046659 | A1 | * | 4/2002 | Smith | 99/422 |
| 2003/0168777 | A1 | * | 9/2003 | Fujita | 264/326 |
| 2007/0251075 | A1 | * | 11/2007 | Felk et al. | 29/407.01 |
| 2014/0138024 | A1 | * | 5/2014 | Hinterseer | 156/274.4 |

FOREIGN PATENT DOCUMENTS

| | | | |
|---|---|---|---|
| DE | 102006004611 A1 | * | 8/2007 |
| WO | 2004/035444 A2 | | 4/2004 |
| WO | WO 2007/140760 | | 12/2007 |
| WO | WO 2007140760 A2 | * | 12/2007 |

OTHER PUBLICATIONS

Translation of First Chinese Office Action of Chinese Application No. 200980135943.2, issued Mar. 4, 2013.

Translation of Second Chinese Office Action of Chinese Application No. 200980135943.2, issued Jan. 22, 2014.

European Office Action of European Application No. 09 736 104.2, issued Jan. 29, 2015 with English translation of relevant parts.

* cited by examiner

APPARATUS FOR WELDING A JOINING REGION OF A FOIL TO A CONNECTING PART AND USE, METHOD, SYSTEM AND BAG

CROSS REFERENCE TO RELATED APPLICATIONS

This application is the National Stage of PCT/DE2009/001168 filed on Aug. 19, 2009, which claims priority under 35 U.S.C. §119 of German Application No. 10 2008 046 064.8 filed on Sep. 8, 2008 and German Application No. 10 2009 007 546.1 filed on Feb. 4, 2009, the disclosures of which are incorporated by reference. The international application under PCT article 21(2) was not published in English.

The invention relates to an apparatus for welding a joining region of a foil with a connecting part as well as a method, a use of a foil, a system for manufacturing bags and a bag, which is manufactured in this manner.

The objective of welding one or multiple foils with a connecting part regularly occurs in industrial manufacturing facilities.

A well-established example is shown in the document WO 2007/140 760 A2. Bags are produced therein, which are eventually used more specifically as medical devices. In order to manufacture the necessary outflow piece on the bag, a tubular connecting part is welded between two foils. For this, the tubular connecting part is disposed on a central electrode. The foils are disposed evenly above and under the connecting part. A tool is then positioned near the foils and evenly surrounds the connecting part with the foils in a joining region during a continuing joining motion of the upper and lower tool, until the foils come in contact with each other next to the joining region. A weld is then manufactured on the one hand between the connecting part and the foils and on the other hand outside the joining region directly between the foils.

In practice, two or more central electrodes are often disposed next to each other in a welding process. In this case, there are several joining regions, namely respectively between the foils and the individual tubular connecting parts, while the foils are welded directly with each other between the joining regions for sealing the bag to be manufactured.

It is understood that more than only two foils can also be employed.

The object underlying the invention is to improve the existing equipment and the resulting products.

According to a first aspect of the invention, this object is solved by an apparatus for welding a joining region of a foil with a connecting part, the apparatus having an extension apparatus for extending the foil inside and/or outside of the joining region.

It must be conceptually explained that the term "joining region" is that area in which the foil is to be connected with the connecting part. "Outside the joining region" is thus an area of the foil which is not to be welded with the connecting part, but which, with one connecting part, is rather located laterally next to it, or, with several connecting parts, laterally between or right next to the joining regions. "Inside" correspondingly refers to an area which is to be in contact with the connecting part when welded.

An "extension" of the foil refers to a mechanical intervention, which aims at making additional length available to the foil, so that the two-dimensional foil can find its necessary additional length, at least a part of it, from the extended area and thus at any rate not completely from the joining region, for reshaping the three-dimensional connecting part without important tensile forces.

The observation underlying the invention is that in the usual treatment of the foil, it is pulled around the connecting part by the welding tool. This involves a strong mechanical impact on the foil, because the connecting part is three-dimensional as a rule and the foil is thus pulled around the flat projection of the connecting part. The flat projection is normally longer than the direct plane connection path between the final positions of the foil. The foil is thus necessarily extended. This applies more specifically to industrial manufacture of welded connections between foils and connecting parts, because endless foil sheets are mostly used therein. These are held to the edge by means of appropriate transport devices, for instance clip chains, spiked chains or with a gripper feed. As well the fact that a plane sheet follows the deformed area as the fact that the sheet is held to the edge both are in the way of a low-tension extension of the foil. According to research by the inventor, the foil extends often exactly in that area of the steep flanges of the connecting parts, thus for instance of the tubular pipes. An expansion of the foil, a bad welding, a squeezing of the foil, a folding, a welding area located in the tube, or altogether a not optimal solidity of the foil next to the weld seam as well as of the weld seam itself can thus occur.

The invention now provides an extension apparatus which causes an extension of the foil for instance outside the joining region. When applying itself around the flat projection of the connecting part, the foil can now draw on the additional necessary spare length from that area of the foil that has been extended by the extension apparatus.

Along the same line of thought, the necessary spare length can also be provided inside the connection area or both inside and outside the connection area.

As a result, the occurring tensions are considerably fewer and quite outstanding welding results have been obtained by the inventor in the test phase of the prototype.

The extension apparatus is preferably disposed in the tool passage in such a manner that it can cause the extension of the foil chronologically before the welding. In such a layout, the extension apparatus first conducts the extension of the foil outside the designated extension area. The foil with its joining region is only subsequently laid around the connecting part, meaning for instance pressed around the connecting part by the tool flanges of the welding tool. During the process of being laid around the connecting part, the foil pulls the previously extended area from the side of the joining region.

The extension apparatus preferably has a deforming tool.

Several possibilities are suitable for the extension tool. It is for instance conceivable that the foil is merely heated until it extends under its own weight or under a mechanical action by a tool or by a blower. These processes are however very difficult to conduct accurately.

A tool should thus more specifically be thought of which actively introduces a predetermined deformation into the foil. It is possible to have a rather good influence on the final shape and dimension of the extension of the foil by the forming operation of the deforming tool.

It is considered particularly advantageous to setup the deforming tool for generating a wave shape in the foil. The effect of a wave shape is that the foil is formed out of its original plane on at least one side, however without sustaining any or only a few bends due to softer transitions. It is furthermore relatively simple to define the length of wave shapes, the number or amplitude of the waves and to manufacture the corresponding tool.

Many other geometries are alternately conceivable, for instance zigzag runs, trapezoidal excursions from the plane of the form or rectangular excursion.

It is also conceivable that the deforming tool itself has a deforming device for its forming surface. It is for instance conceivable that the deforming tool deformingly engages the foil with a metal strip, while the metal strip is being held rearward in several discrete points by adjusters. Adjusting the adjusters relative to each other and/or relative to the actual plane of the foil, not only allows to set the exact shape but also for instance to quite precisely provide a custom-made extension, without having to change the tool.

Calculating the additional length obtained by the wave shape is particularly easy, when the deforming tool is setup in order to generate a wave shape with a sinusoidal section in the foil.

In other words, and irrespective of all preceding thoughts about the invention, the object is generally solved by generating a spare length in the foil outside the joining region of the foil, namely preferably by means of a deforming tool.

In a preferred embodiment of the invention, such a deforming tool generates a spare length in the foil which, between two fixed points of the foil, amounts to at least half a flat projection of the joining region. In the ideal case, the spare length is at least as big as the entire flat projection of the joining region, the difference between respectively the half or the entire flat projection and the original straight axis-shaped joining possibly being already sufficient.

It must be conceptually explained, that the term "flat projection of the joining region" means the length of the distance which the foil must take up on average when positioned with its joining region around the connecting part. If, as described in the document WO 2007/140 760 A2, a foil is welded from above and a foil is welded from below onto a circular tube, the flat projection of the upper and lower foil is identical and corresponds respectively to a half of the circumference of the tube section to be welded. With other forms, it is offhand conceivable that the flat projections of the foil above and below the connecting part have different lengths. It is also conceivable to cause a connection with several foils above and/or below, for instance if multilayered bags are to be produced.

Depending on the choice of the foil regarding material and thickness of the foil it can be opportune to hypothesize different flat projections of the foil because the outer foil not only must surround the connecting part but also the intermediary inner foil section. It is therefore conceivable that the several foils are subjected to different extensions. In most cases however it will be more efficient to extend both foils with an extension device. The later conditions can hereby also be allowed for, for instance in that the later bend of both foils around the connecting part is taken into account in the generated wave shape.

In order to ease an extension of the foil it is proposed that the extension device has a foil heater. With most foil materials it is considerably gentler for the material if a heating of the foil occurs before or during the extension intervention, at least in the area outside the joining region.

It is thus conceivable for instance that the extension device has a radiant heater and an unheated deforming tool.

In most cases, tests by the inventor have however shown that it is advantageous if the extension device has a heated deforming tool. This can seize, heat and deform the foil in one work step, whereas either two chronologically consecutive working steps or a heating spatially disposed in the admission to the deforming tool are otherwise necessary.

It has already been pointed out that the apparatus can have a transport device for an endless foil sheet. An adequate use of the invention not only allows for manufacturing single sheets but also treating an endless foil sheet.

Regarding the disposition of the extension device relative to an already existing welding device, it is conceivable that they are disposed on a station as well as on separate stations. The disposition on one station will regularly allow a spatially more compact system, while the disposition on separate stations will regularly reduce the running time through the system.

Regarding the disposition of extension device it has furthermore already been pointed out that it is preferably disposed in such a manner that the extension device can cause an extension of the foil between two joining regions or between three or more joining regions, depending on the number of connecting parts provided in one operation cycle and usually in one geometrical line. In the case of the document WO 2007/140 760 A2 it is for instance proposed to dispose two tube sections on a bag. This requires as far as possible a simultaneous welding of both tubes in a tool by means of two central electrodes. In this case the extension device should at least engage laterally outside of both designated joining regions, or between both designated joining regions. It is particularly advantageous if an extension device engages between the designated joining regions as well as laterally outside of them.

According to a second aspect of the invention, the object is solved by using a foil with a wave shape outside a joining region for welding the joining region to a connecting part.

This thought of the invention is based on the realization that such a foil could be supplied by a supplier to the system that ultimately conducts the welding.

However, it is certainly technically easier to use a plane endless foil sheet and to submit it to the directed extension in the system which ultimately also conducts the welding.

The example of the bags clearly shows that the introduced extensions, for instance the waves should often not be available along the whole length of the endless foil sheet, but rather in a few discrete places, for instance only on one lamellar region, disposed perpendicularly or parallel to the direction of the machine, per single sheet.

According to a third aspect of the invention, the assigned object is solved by a method for welding a joining region of a foil with a connecting part, a spare length of the foil being first created outside the joining region through extension and the joining region being only subsequently welded to the connecting part, a welding of a foil with another foil preferably occurring simultaneously.

This method has already been described above. The fundamental thought of the method is that the spare length is created first.

The method makes it possible to obtain a particularly high product quality with regard to the welded connecting parts, if, in a preceding step, a deforming tool is selected, manufactured or setup with regard to its forming outline by means of a method of calculation.

The fundamental thought hereby is that different extensions of the foil should be available for different materials of the foils, more specifically however for connecting parts of varying size or numbers. The extensions can be different on the one hand with regard to the measurement of the extension or on the other hand with regard to the shape or position of the extensions.

In order to introduce different extensions or a single sheet foil into the fed foil, a tool that is as adapted as possible can be chosen from a battery, or a tool is first specifically manufactured by means of a method of calculation. It is thus more specifically conceivable that the measurement of the necessary foil extension that is required in order to press the foil around the flat projection of the connecting part is calculated.

A tool can then be chosen which corresponds as precisely as possible to this extension, or a tool is manufactured which offers this extension as precisely as possible. It is alternately conceivable that an adjustment of the deforming tool is conducted with regard to the calculated or iteratively ascertained necessary extension, so that a wide variety of extensions with regard to amplitude, shape or location of waves is made possible with one and the same deforming tool.

It shall be understood that the advantages of a welding apparatus as described above also induce an advantage for the entire system for producing bags from two foils or from several foils with one or several tubular connecting parts welded in between the foils.

The advantage also impacts directly on a bag which is manufactured from at least two foils and at least one connecting part by means of an apparatus described above, by means of a use described above, by means of a method described above and/or by means of a system described above.

Figure 2:
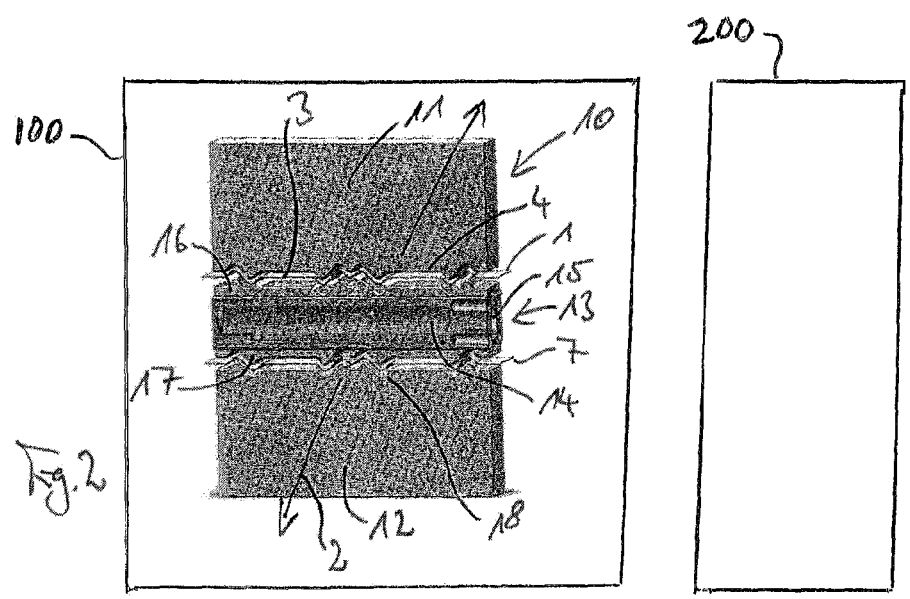
Figure 3:
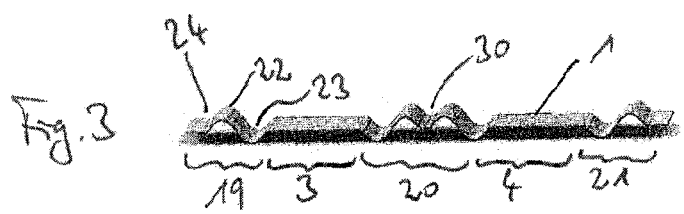
Figure 4:
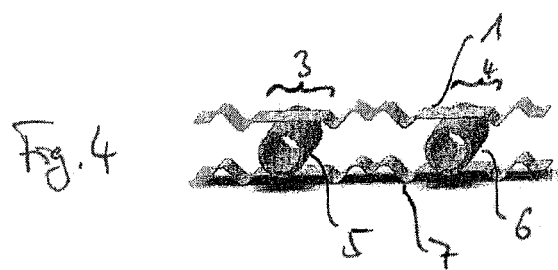
Figure 5:
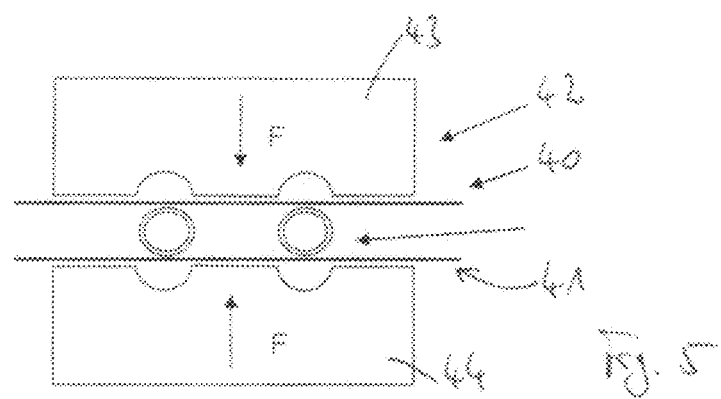
Figure 6:
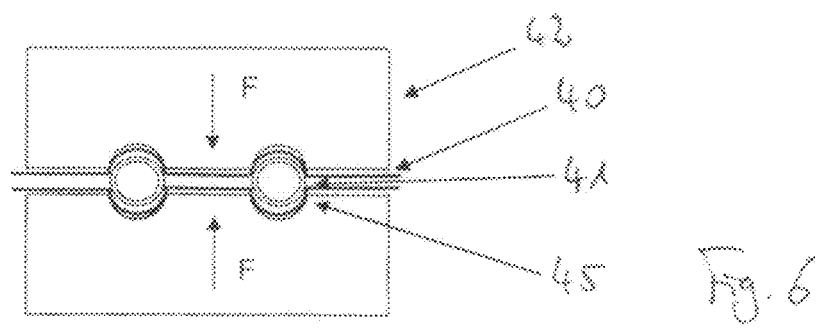
Figure 7:
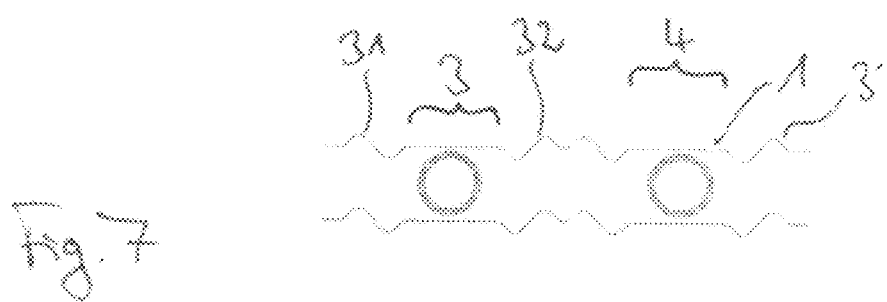

The invention is further explained in the following by means of an exemplary embodiment with reference to the drawings. In the drawings:

FIG. 1 shows respectively in a perspective view a single sheet of a foil in the original state, FIG. 2 shows the single sheet from FIG. 1 in a deforming tool, FIG. 3 shows the single sheet from FIGS. 1 and 2 in the deformed state, FIG. 4 shows two of these single sheets with two tubular connecting parts, FIG. 5 shows respectively a schematic of a section of two planar foils and two tubular connecting parts according to the prior art, FIG. 6 shows the disposition from FIG. 5 in the operating state and FIG. 7 shows two pre-formed foils and two tubular connecting parts.

The single sheet 1 in FIGS. 1, 2, 3, 4 and 7 is a foil strip. An endless foil sheet could likewise be available in a machine direction 2. The single sheet 1 has a length of 65 mm for instance. This corresponds thus to the theoretical width of the endless foil sheet perpendicularly to the machine direction 2.

It must be explicitly pointed out that the disposition of the machine direction 2 and the orientation of the extended strip is only an easily shown example.

In practice one rather encounters mostly two other variants. On the one hand a tubular foil that is transported in the machine direction, while the extension strips are located perpendicularly to the machine direction. On the other hand foil layers for manufacturing bags, with which the extension strip is disposed parallel to the machine direction, often conveniently along the edge of the foil layers.

The single sheet 1 is provided for being welded in two joining regions 3, 4 with the tubular connecting parts 5, 6.

A system for welding the single sheet 1 with both tubular connecting parts 5, 6 and another foil in form of another single sheet 7 has two central electrodes, meaning rod-shaped electrodes, on a welding station and line electrodes for this.

In the case of a thermal welding method other welding tools can be used. It is more specifically conceivable that the connecting part can do without a die insert and is instead held from the outside, for instance clamped.

A welding of the joining regions 3, 4 respectively with the flat projections of the tubular connecting parts 5, 6 is to be carried out. Concretely, the single sheet 1 with its joining regions 3, 4 is to be laid around the connecting parts 5, 6 in such a manner that the single sheet 1 runs exactly around the upper half of the circumference of the connecting parts 5, 6, whereas the joining regions of the other single sheet 7 run around the lower halves of both connecting parts 5, 6.

The single sheet 1 is to be welded with the other single sheet 7 between the joining regions, meaning in the end state, between those areas which run around the connecting parts 5, 6.

The result is a sealing joint between the single sheet 1 and the other single sheet 7 with the exception of both passages in form of the tubular connecting parts 5, 6.

Regarding the disposition of the extension device relative to an already existing welding device, it is conceivable that they are disposed on a station 100 as well as on separate stations 200. The disposition on one station will regularly allow a spatially more compact system, while the disposition on separate stations will regularly reduce the running time through the system.

The deforming tool 10 with an upper tool 11, a lower tool 12 and a middle tool 13 is disposed in the supply to the production system, the central tool 13 carrying a lower counterpart 16 to the upper tool 11 as well as an upper counterpart 17 for the lower tool 12 on a central support 14 with a bore 15. The bore serves for instance for passing cooling means or hot media or for receiving a stationary disposed heating means.

The upper tool 11, the central tool 13 and the lower tool 12 form a line. They are disposed perpendicularly to the machine direction 2 (when working an endless foil sheet), or to the single sheet 1 and the other single sheet 7.

The deforming tool 10 is heatable at least in the central tool 13, preferably also in the upper and lower tool 11, 12. The central tool is disposed between the single sheet 1 and the other single sheet 7, respectively the corresponding endless foil sheet, the upper tool 11 above and the lower tool 12 below it. The upper tool 11 and the lower tool 12 can be moved to or from the central tool 13 controlled by force or by distance.

When the production system is operating, meaning either in continuous operation with an endless foil sheet or in discrete operation with single sheets 1, 7, the deforming tool 10 is spatially separated from a welding device and is disposed chronologically before it in the passage through the system.

Both single sheets 1, 7 are inserted into the deforming tool 10. The central tool 13 and preferably also the upper and lower tool 11, 12 are heated and subsequently led toward the central tool. Through contact with the single sheets 1, 7, these are also heated and are consequently easier deformable. The forming surfaces of the upper tool 11 as well as of the lower tool 12 and of the counterparts 16, 17 on the central tool 13 have several wave shapes 18 (exemplarily marked) between the designated joining regions 3, 4.

Via the wave shaped forming surfaces, both single sheets 1, 7 obtain a shape which is imprinted into the foil even after separation of the deforming tool 10. Since the single sheets 1, 7 are attached to the edge, and since they are also largely attached in the area of the joining regions 3, 4, the single sheets 1, 7 are quite predominantly, yet not exclusively, extended in three extension regions 19, 20, 21 through mechanical intervention.

In a concrete example on a prototype of the inventor, the imprint of an accordion in the foil has resulted in an extension of each single sheet 1, 7 from 65 mm (original state) to 74.63 mm (deformed state).

An extension of the foil by 9.63 mm was thus achieved, namely in the form of a wave with wave crests (22) (exemplarily marked) and wave troughs (23) (exemplarily marked).

The deforming tool 10 thus serves in the sense of the invention as an extension device and it generates an extension of the single sheets 1, 7 of the foil in the extension regions 19, 29, 21 and thus outside of the joining regions 3, 4.

In the described example, the forming surface on the deforming tool 10 carries sinusoidal crests and troughs, so that a bend in the foil appears at this transition point 24 between the plane areas and the wave shaped areas of the single sheet 1, 7. This can however be avoided offhand in that the plane areas are followed by sinusoidal regions which lie at a maximal value of a sinusoidal curve. It would thus be conceivable for instance to provide only crests instead of crests 22 and troughs 23.

It is of course also conceivable to imprint any other trigonometric functions or any other forms onto the foil. It is however advantageous if the characteristics of the forming surface on the deforming tool 10 can be described analytically, because the extension of the foil and thus the gained spare length can then be calculated analytically with simple means.

It must be mentioned that the deformed regions, meaning the wave crests and the wave troughs do not have to reach immediately up to the joining regions 3, 4. This means in other words that the deformed regions 19, 20, 21 do not have to be identical to the plane areas on the foil. It is rather also conceivable to leave a plane strip between the limit of a joining region 3, 4 and the beginning of a deformed region 19, 20, 21.

In the present example, the deformation has been arranged on the single sheets 1, 7 symmetrically to each joining region 3, 4:

Respectively one wave with a wave crest 22 and a wave trough 23 is thus located on each side of each joining region 3, 4. The wave of that half of the single sheet 1, 7 which is arranged symmetrically relative to the adjacent joining region is directly attached to a centre of an axial symmetry 30. There are thus four waves in total with respectively one wave crest 22 and one wave trough 23 for two joining regions 3, 4.

It is ensured in this manner that each joining region 3, 4 can resort to two areas with spare lengths 31, 32, 33 and that neither between two pipes, nor between the pipes and the edge there is an area in which the foil does not have any spare length when the joining regions 3, 4 are pressed around the flat projections of the connecting parts (cf. for all this more specifically with FIG. 7).

In the prior art however, the upper foil 40 and a lower foil 41 (cf. FIGS. 5, 6) are inserted in a planar form into a welding tool 42. An upper tool 43 and a lower tool 44 then drive against each other with a gripping pressure F. This amounts to a strong pullout of the foil at the flanks of the tool 45. The foil cannot smoothly slide up. There is thus always a risk of forming critical areas regarding solidity or impermeability.

The invention rather achieves a surprisingly good improvement of the welding in the area foil, tube, foil through smooth and controlled extension.

The invention claimed is:

1. An apparatus for welding a joining region of a foil with a three-dimensional connecting part, the apparatus comprising a welding device comprising:
   a transport device configured to hold an edge of the foil; and
   an extension device comprising a deforming tool for extending the foil inside and/or outside of the joining region by lengthening the foil material through mechanical deformation while the edge of the foil is held by the transport device and prior to pulling the foil around said three-dimensional connecting part, to provide additional length in a deformed region of the foil without requiring an additional quantity of the foil, wherein the deformed region provides an additional length necessary for welding the foil to the three-dimensional connecting part when the foil is pulled around said three-dimensional connecting part by the welding tool and the joining region is welded to said three-dimensional part.

2. The apparatus according to claim 1, wherein the extension device is disposed in a tool passage in such a manner that it can cause an extension of the foil chronologically before the welding.

3. The apparatus according to claim 1, wherein the deforming tool generates a wave shape in the foil.

4. The apparatus according to claim 1, wherein the deforming tool generates a sinusoidal wave shape in the foil.

5. The apparatus according to claim 1, wherein the deforming tool generates a spare length in the foil, which between two fixed points of the foil amounts to at least half a flat projection of the joining region.

6. The apparatus according to claim 1, wherein the extension device has a foil heating.

7. The apparatus according to claim 1, wherein the extension device has an unheated deforming tool and a radiant heater.

8. The apparatus according to claim 1, wherein the extension device has a heated deforming tool.

9. The apparatus according to claim 1, wherein the extension device and the welding device are disposed on a station.

10. The apparatus according to claim 9, wherein the extension device and the welding device are disposed on a combined tool.

11. The apparatus according to claim 1, wherein the extension device and the welding device are disposed on separate stations.

12. The apparatus according to claim 1, wherein the extension device is disposed in such a manner that it can cause an extension between two joining regions.

* * * * *